United States Patent [19]

Bessho

[11] Patent Number: 4,585,984
[45] Date of Patent: Apr. 29, 1986

[54] ALTERNATING CURRENT MOTOR

[76] Inventor: Kazuo Bessho, No. 7-10, Wakunami 2-chome, Kanazawa-shi, Ishikawa-ken, Japan

[21] Appl. No.: 704,271

[22] Filed: Feb. 22, 1985

[30] Foreign Application Priority Data

Feb. 27, 1984 [JP] Japan .................................. 59-37015

[51] Int. Cl.4 .................................................. H02P 5/34
[52] U.S. Cl. .................................... 318/750; 318/701; 310/172
[58] Field of Search ................. 318/750, 814, 729, 701

[56] References Cited

U.S. PATENT DOCUMENTS

| | | | |
|---|---|---|---|
| 1,696,617 | 12/1928 | Welch | 310/172 |
| 2,040,508 | 5/1936 | Thompson | 318/172 |
| 2,123,140 | 7/1938 | McCarty | 318/750 |
| 2,322,942 | 6/1943 | Lange | 318/750 |

Primary Examiner—David Smith, Jr.
Attorney, Agent, or Firm—Larson and Taylor

[57] ABSTRACT

An alternating current motor comprising a combination of magnetic frequency tripler and induction rotor. The alternating current motor includes a three-legged core of which two legs serve as input leg having a coil wound thereabout and thereby constitute a linear reactor and a saturated reactor. The two coils are connected in series. The residual one leg serves as output leg which generates magnetic flux having tripled frequency by applying single phase input to the input legs. A rotor is rotatably disposed in the cylindrical gap formed in the output leg. Thus, the rotor is stably rotated at a higher rotational speed equivalent to synchronized speed determined by tripled frequency relative to frequency of alternating current supplied from commercial power supply system.

4 Claims, 4 Drawing Figures

ALTERNATING CURRENT MOTOR

BACKGROUND OF THE INVENTION

1. Field of the Invention

The present invention relates to an alternating current motor of the type comprising a combination of magnetic frequency multiplier for increasing frequency of electric current supplied from power supply line and rotor normally usable for induction motor.

2. Description of the Prior Art

To rotate a rotor of the hitherto known alternating current motor at a higher rotational speed there was already made a proposal for energizing the motor with high frequency voltage and thereby rotating the rotor at a higher rotational speed. In the conventional motor of the above-mentioned type a magnetic frequency multiplier was mostly used for increasing the working frequency. Alternatively, an inverter may be employed for the same purpose of increasing the working frequency of supplied electric current.

However, it has been pointed out as drawbacks inherent to the conventional alternating current motor that there is necessity for specific power supply system adapted to change working frequency as required in spite of the advantageous feature that rotational speed can be smoothly controlled with the minimized loss and moreover installation of the conventional motor is carried out at a very expensive cost.

Further, there was made another proposal for utilizing a frequency converter with a circuit including semiconductors incorporated therein. Practically, it has been found that this proposal has an advantageous feature that rotational speed of the motor can be adjusted as required by changing the working frequency of supplied electric current but when shifting the direction of transmission of electric current, there is generated noisy sound and in some place an occurrence of electric wave hindrance is unavoidably recognized.

SUMMARY OF THE INVENTION

Thus, the present invention has been made with the foregoing problems in mind and its object resides in providing an alternating current motor of the type including a magnetic frequency tripler comprising a three-legged core and a rotor rotatably disposed in the space as defined by an opposing pair of magnetic poles constituting the output leg of the magnetic frequency tripler so as to rotate the rotor at a higher rotational speed by using rotary magnetic flux which has tripled angular speed relative to the frequency of inputted electric current.

It is other object of the present invention to provide an alternating current motor which assures higher speed rotation for a long period of time without any occurence of mechanical and electrical trouble.

It is another object of the present invention to provide an alternating current motor which has no fear of causing such a malfunction as electric wave hindrance or the like during operation of the motor.

It is still another object of the present invention to provide an alternating current motor which has a durable structure and can perform maintenance service for the motor very easily.

Other objects, features and advantages of the invention will be more clearly apparent from reading of the following description which has been prepared in conjunction with the accompanying drawings.

BRIEF DESCRIPTION OF THE DRAWINGS

The accompanying drawings schematically illustrate an alternating current motor which includes a three-legged core for constituting a magnetic frequency tripler adapted to generate single phase output having tripled frequency and moreover a cage rotor usable for induction motor rotatably disposed in a gap formed in the output leg so that the cage rotor is rotated at a rotational speed synchronized with tripled frequency relative to frequency of alternating current inputted from commercial power supply system.

Now, the accompanying drawings will be briefly described below.

DESCRIPTION OF THE PREFERRED EMBODIMENT

Now, the present invention will be described in a greater detail hereunder with reference to the accompanying drawings which illustrate a preferred embodiment thereof.

Figure 1:
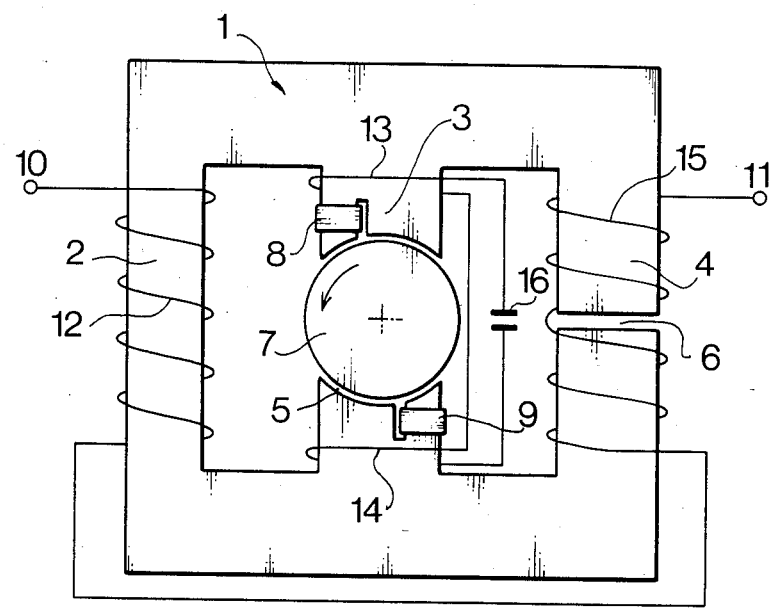
FIG. 1 is a schematic front view of an alternating current motor according to an embodiment of the invention.

First, referring to FIG. 1, reference numeral 1 designates a three-legged core which includes a first leg 2 and a third leg 4. Both the first leg 2 and the third leg 4 have input coils 12 and 15 wound thereabout. Specifically, the input coils 12 and 15 are connected in series in such a manner that their magnetic flux is oriented in the same direction to have the same polarity and their ends are connected to input terminals 10 and 11. It should be noted that the third leg 4 is dimensioned to have a cross-sectional area larger than that of the first leg 2 and moreover it has a gap 5 formed at the middle part thereof. Thus, the arrangement of the core 1 made in that way assures that the first leg 2 and the input coil 12 function as saturated reactor and the third leg 4 and the input coil 15 function as linear reactor.

Further, the core 1 includes a second leg 3 which is formed at the middle part thereof with a cylindrical gap 5 for rotatably disposing a cage rotor 7 usable for induction motor. Thus, the cylindrical gap 5 has two opposed magnetizable arch-shaped concave faces which are formed with cutouts at each one side into which shading coils 8 and 9 made in the form of a metallic ring are fitted later respectively. The second leg 3 has coils 13 and 14 wound thereabout which are connected in series. A condenser 16 for resonating tripled frequency is disposed at the position located midway of a conductor extending between both the terminals of the coils 13 and 14.

Now, it is assumed that single phase AC voltage is applied to both the input terminals 10 and 11. As a result, alternating magnetic flux having tripled frequency relative to frequency of power supply system is generated in the second leg 3 and thereby rotational magnetic flux having a synchronized speed corresponding to the tripled frequency is produced in the area as defined by the gap 5 in cooperation with the shading coils 8 and 9. This causes the cage rotor 7 to rotate at a higher rotational speed.

Figure 2:
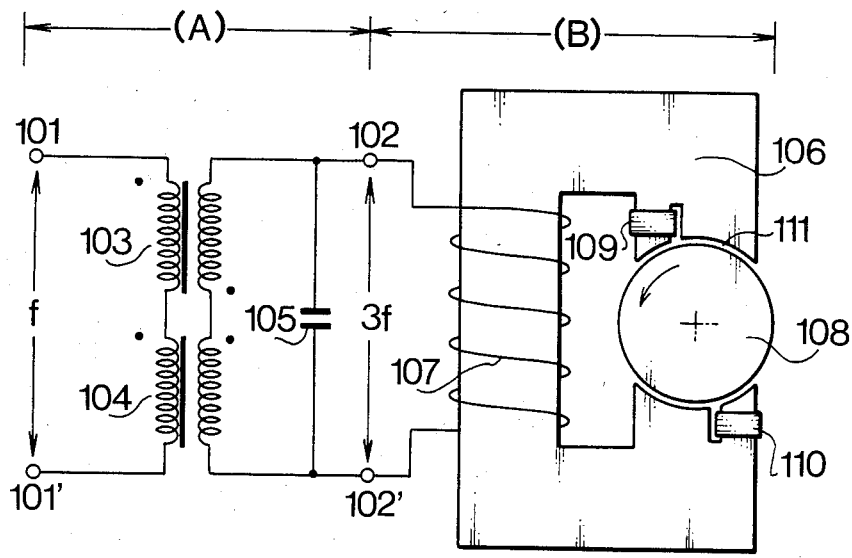
FIG. 2 is a schematic view particularly illustrating the principle of operation of the motor.

Next, FIG. 2 is an equivalent circuit for the alternating current motor as illustrated in FIG. 1. As is apparent from the drawing, the equivalent circuit is divided into two sections from the viewpoint of given functions, one of them being (A) section and the other one being (B) section.

More specifically, (A) section is adapted to function as magnetic frequency which serves to convert frequency of input voltage to tripled frequency. The magnetic frequency tripler is constructed such that primary coils of both the linear reactor 103 and the saturated reactor 104 are connected in series and their ends are connected to input terminals 101 and 101', while secondary coils of them are connected in series with reverse polarity and their ends are connected to output terminals 102 and 102'. Further, a condenser 105 is interposed between both the output terminals 102 and 102' in parallel with both the linear reactor 103 and the saturated reactor 104.

When input voltage is applied to the input terminals 101 and 101' in (A) section, it results that input frequency f is converted into tripled frequency and therefore frequency of output voltage as measured between both the output terminals 102 and 102' becomes 3f.

On the other hand, (B) section constitutes a conventional induction motor with shading coils 109 and 110 fitted thereto which is driven by single phase alternating current and an intensity of rotary magnetic flux in the cylindrical gap 111 is determined by frequency of input voltage.

Accordingly, when alternating voltage is applied to the input terminals 101 and 101' in (A) section, it results that an intensity of rotary magnetic flux is tripled, compared with the case where alternating voltage is applied directly to the terminals 102 and 102' which serve as input terminals in (B) section. Incidentally, in FIG. 2 reference numeral 106 designates a core and reference numeral 107 does a coil.

Figure 3:
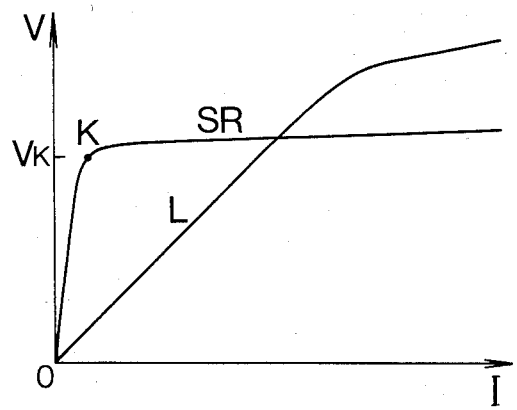
FIG. 3 is a characteristic diagram showing two characteristic lines with respect to a relation of current to voltage for both the linear reactor and the saturated reactor as illustrated in FIG. 2.

Next, FIG. 3 is a characteristic curve which represents the relation between the linear reactor 103 and the saturated reactor 104 with respect to voltage V relative to current I. In the drawing reference letter L designates a characteristic curve of the linear reactor 103 and reference letters SR designate a characteristic curve of the saturated reactor 104. Further, in the drawing reference letters Vk designate saturated voltage of the saturated reactor 104.

Figure 4:
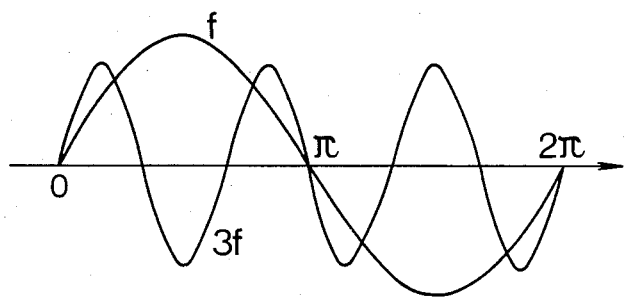
FIG. 4 is an input and output voltage wave diagram with respect to the magnetic frequency tripler in the equivalent circuit as illustrated in FIG. 2.

Finally, FIG. 4 schematically illustrates frequency f of input voltage supplied to the input terminals 101 and 101' and frequency 3f of output voltage appearing at both the output terminals 102 and 102' in (A) section. As is apparent from the drawing, initial frequency is converted to tripled one by means of the magnetic frequency tripler. As a result, sychronized speed of rotary magnetic flux in the gap 111 in (B) section is converted to tripled one.

For instance, it is assumed that single phase voltage having frequency of 60 Hz supplied from commercial power supply system is applied to the input terminals 101 and 101'. This causes the cage rotor 108 to be rotated at a rotational speed of about 10,000 rpm.

In the illustrated embodiment the present invention has been described with respect to alternating current motor with a cage rotor incorporated therein but it should of course be understood that is should not be limited only to this. Alternatively, the present invention may be applied to synchronous motor having a rotor made of permanent magnet employed therefor, hysteresis motor using a cylindrical ring made of material having high hysteresis or the like motor. Obviously, such changes or modifications are merely a matter of design change or modification and can be easily achieved by any expert in the art.

What is claimed is:

1. An alternating current motor essentially comprising:
    a three-legged core including two legs as input leg and one leg as output leg, one of said two input legs being formed with a gap and each of said two input legs having a coil wound thereabout which serves as input coil, of which polarity is determined same by connecting two coils in series and of which both ends lead to input terminals,
    a rotor usable for induction motor rotatably disposed in a cylindrical gap formed in the output leg, said gap having two opposed magnetizable arch-shaped concave faces,
    shading coils fitted into cutouts formed on each one side of the opposed concave faces, and
    a condenser for effecting resonance, said condenser being disposed in parallel relative to the coils on the input legs,
    whereby said rotor can be rotated at a higher rotational speed by charging alternating voltage to said input terminals.

2. An alternating current motor as defined in claim 1, wherein said rotor is constructed in the form of a cage rotor usable for induction motor.

3. An alternating current motor as defined in claim 1, wherein said rotor is constructed in the form of a rotor made of permanent magnet usable for sychronous motor.

4. An alternating current motor as defined in claim 1, wherein said rotor is constructed in the form of a rotor comprising a cylindrical ring made of material having high hysteresis usable for hysteresis motor.

* * * * *